(12) United States Patent
Hahn

(10) Patent No.: US 9,003,742 B2
(45) Date of Patent: Apr. 14, 2015

(54) CLOSURE TOP BUFFER WITH AN INSPECTION UNIT

(75) Inventor: Wolfgang Hahn, Donaustauf (DE)

(73) Assignee: Krones AG (DE)

( * ) Notice: Subject to any disclaimer, the term of this patent is extended or adjusted under 35 U.S.C. 154(b) by 362 days.

(21) Appl. No.: 12/560,061

(22) Filed: Sep. 15, 2009

(65) Prior Publication Data

US 2010/0064640 A1    Mar. 18, 2010

(30) Foreign Application Priority Data

Sep. 16, 2008 (DE) .......................... 10 2008 047 286

(51) Int. Cl.
| | |
|---|---|
| *B65B 57/02* | (2006.01) |
| *B67B 3/26* | (2006.01) |
| *B67C 7/00* | (2006.01) |
| *B29C 49/06* | (2006.01) |
| *B65B 7/28* | (2006.01) |
| *B65B 57/00* | (2006.01) |
| *B67C 3/22* | (2006.01) |

(52) U.S. Cl.
CPC .................. *B67B 3/262* (2013.01); *B29C 49/06* (2013.01); *B65B 7/2807* (2013.01); *B65B 57/005* (2013.01); *B67B 2201/08* (2013.01); *B67C 7/0073* (2013.01); *B67C 2003/227* (2013.01)

(58) Field of Classification Search
CPC  B67C 7/0073; B67C 2003/227; B67B 3/262; B67B 3/06; B67B 3/062; B67B 3/064; B67B 2201/08; B65B 7/2807
USPC .......................... 53/485, 471, 64, 281, 282, 72
See application file for complete search history.

(56) References Cited

U.S. PATENT DOCUMENTS

| | | | | |
|---|---|---|---|---|
| 3,792,606 | A | * | 2/1974 | Munger ............................ 73/40 |
| 4,055,455 | A | * | 10/1977 | McDonald et al. ........... 156/351 |
| 4,086,497 | A | * | 4/1978 | Murray .................... 250/559.42 |
| 4,870,806 | A | * | 10/1989 | Sprenger ........................ 53/485 |
| 4,872,300 | A | * | 10/1989 | Luke ................................. 53/53 |
| 5,349,843 | A | * | 9/1994 | Hubball ......................... 72/344 |
| 5,668,307 | A | * | 9/1997 | Wade ............................ 73/40.7 |
| 6,341,469 | B1 | * | 1/2002 | Derouault et al. ................ 53/75 |
| 6,401,973 | B1 | * | 6/2002 | Derouault et al. ............ 221/120 |

(Continued)

FOREIGN PATENT DOCUMENTS

| | | |
|---|---|---|
| CN | 1259104 | 7/2000 |
| DE | 3740991 A1 | 6/1989 |

(Continued)

OTHER PUBLICATIONS

China Office Action dated May 28, 2014, issued in corresponding China Application No. 2009101750413.

*Primary Examiner* — Andrew M Tecco
(74) *Attorney, Agent, or Firm* — Onello & Mello, LLP.

(57) ABSTRACT

An apparatus for producing containers may include a transport unit which transports the containers along a specified transport path, at least one handling unit which handles the containers in a specified manner, a closing unit which is located downstream of the handling unit in a transport direction of the containers and which fits closure tops onto the containers, and a feeding unit which feeds the closure tops to the closing unit. An inspection unit may be provided upstream of the feeding unit in a transport direction of the closure tops. The inspection unit inspects the closure tops and emits at least one signal which is characteristic of the physical condition of the closure tops.

21 Claims, 1 Drawing Sheet

(56) References Cited

U.S. PATENT DOCUMENTS

| | | | |
|---|---|---|---|
| 7,322,160 B2* | 1/2008 | Herzog | 53/75 |
| 2002/0033007 A1 | 3/2002 | Derouault et al. | |
| 2006/0283145 A1* | 12/2006 | Weisgerber et al. | 53/167 |

FOREIGN PATENT DOCUMENTS

| | | |
|---|---|---|
| DE | 19727942 A1 | 1/1999 |
| DE | 19812057 A1 | 9/1999 |
| DE | 199 28 325 A1 | 12/2000 |
| DE | 10146449 A1 | 4/2003 |
| DE | 203 08 513 U1 | 8/2004 |
| DE | 102006053193 A1 | 5/2008 |
| EP | 2086869 A1 | 8/2009 |
| JP | 2001315723 A | 11/2001 |
| WO | 2008/055685 A1 | 5/2008 |

* cited by examiner

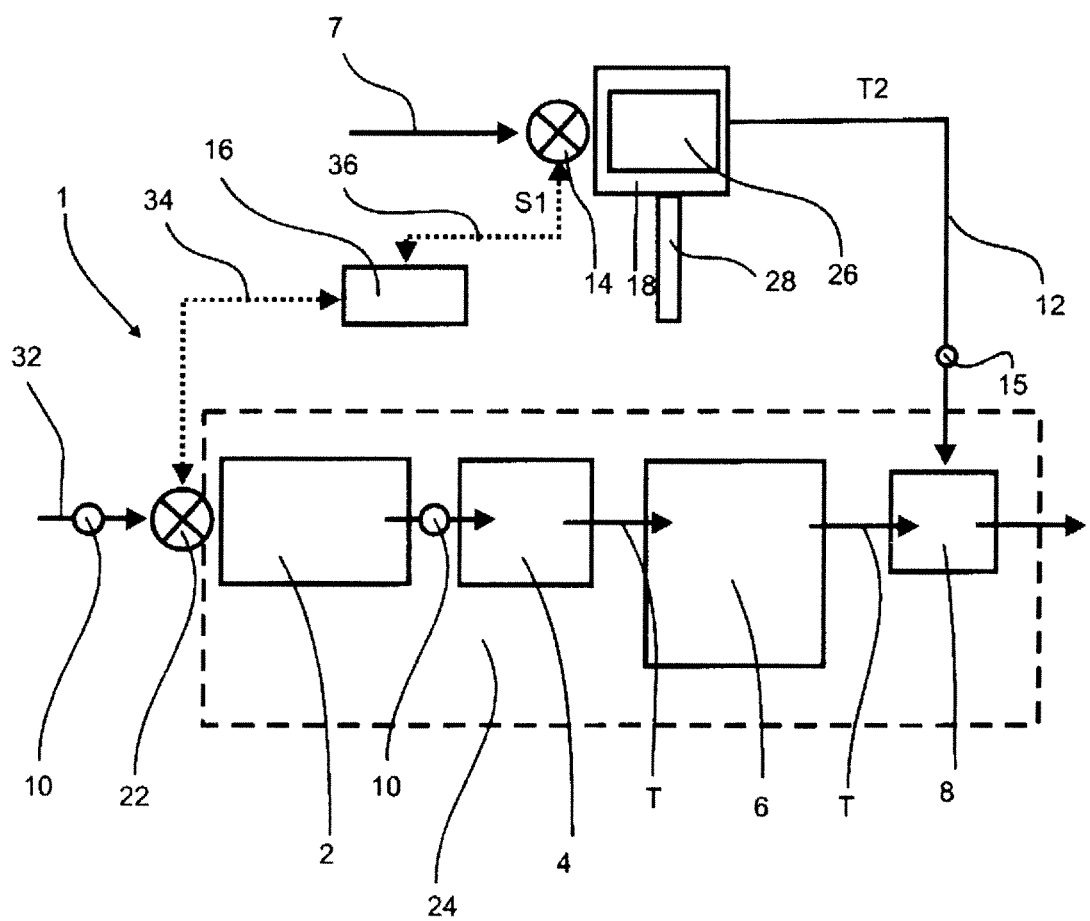

US 9,003,742 B2

CLOSURE TOP BUFFER WITH AN INSPECTION UNIT

CROSS-REFERENCE TO RELATED APPLICATION

This application claims the benefit of priority of German Patent Application No. 10 2008 047 286.7, filed Sep. 16, 2008, pursuant to 35 U.S.C. 119(a)-(d), the disclosure of which is incorporated herein by reference in its entirety as if fully set forth herein.

TECHNICAL FIELD

The present disclosure relates to an apparatus for producing containers.

BACKGROUND

From the prior art it has been known for a long time to first produce containers, then to fill them, and finally to close them with a container closure top. In this connection it is also known to feed the container closure tops to a closing device which subsequently closes the containers with the closure tops which also arrive at the closing device. Such systems operate satisfactorily and usually also allow a high throughput to be achieved. However, there may be problems at times in cases where faulty closure tops are encountered or where the stream of closure tops is interrupted.

It may therefore be desirable to provide an apparatus and a method for producing containers which allow a flexible response even in the case of a fault. By this means, the reliability of such an apparatus for producing containers is intended to be enhanced.

SUMMARY OF INVENTION

An apparatus according to the disclosure for producing containers may include a transport unit which transports the containers along a predetermined transport path. Moreover, at least one handling unit may be provided which handles the containers in a specified manner, as well as a closing unit which is located downstream of the handling unit in a transport direction of the containers and which fits a closure top onto the containers. Further, a feeding unit may be provided, which feeds the closure tops to the closing unit.

According to the disclosure, an inspection unit may be provided upstream of the feeding unit in a transport direction, which inspects the closure tops and which emits at least one signal that is characteristic of a physical condition of the closure tops. The expression "production of containers" as used herein is understood to mean, for example, the production of filled containers, that is, apart from the production of the container itself also the filling thereof and, if necessary, any further process steps such as the sterilisation of the containers.

Thus, according to the disclosure it is suggested to provide an inspection device of this kind not directly in the closing device, but upstream thereof or even upstream of a feeding unit for the closure tops. This feeding unit may be, for example, a passage or a section along which the closure tops are guided. By positioning this inspection unit upstream of this feeding unit, a flexible response to any fault conditions is made possible, since a faulty closure top will not immediately result in an equally faulty closing process. The feeding unit will, in some aspects, also be used as the transport unit for the closure tops.

The handling unit may be or may include a reforming unit which transforms preforms into containers. Thus, apparatuses consistent with the disclosure may be particularly suitable for systems including reforming units such as, for example, stretch blow-moulding machines which transform plastic preforms into plastic containers. Apart from the reforming unit, a filling unit may be provided downstream thereof, which fills the containers so that they may subsequently be closed with the closure tops. However, the present disclosure is also suitable for use in the production of other containers such as for example glass containers.

The handling unit and, if present, also other handling units may be located in a sterile room.

In a further exemplary embodiment, a blocking unit may be provided upstream of the handling unit in a transport direction of the containers, which may be used to interrupt the supply of containers. The term "containers" is intended to cover both the plastic preforms and the plastic containers produced from these plastic preforms.

In some aspects, the blocking unit may be controlled as a function of a signal emitted by the inspection unit. If, for example, a permanent fault in the closure top supply is detected, the supply of preforms may be blocked as a response to such a fault. Apart from that, the blocking unit may, however, also be actuated as a response to other signals, such as, for example, to error messages of the blow-moulding unit or the closing unit. The blocking unit may also be activated by a deliberate operator action.

Conversely, however, the blocking unit may also transmit a corresponding signal to a further blocking unit for the closure tops, so that, for example, in the case of a failure in the supply of preforms, also the supply of the closure tops will be blocked. In some aspects, the physical condition may comprise a faulty condition of the closure tops. Such a faulty condition may, for example, be a faulty or an altogether missing thread. Apart from that, the faulty condition may also be a deformation of the closure tops or the like. It would also be conceivable that the physical condition might be a misalignment of the closure tops in the supply line, but the physical condition will typically be an actual fault or defect in the closure tops themselves.

In an exemplary embodiment, the closing unit and the handling unit may be disposed together in a block system. This means that the closing unit and the handling unit may be interlocked with one another or permanently synchronised. Further, a plurality of handling units may be provided in this block system, such as, for example, a heating unit for a blow-moulding machine, a blow-moulding machine for the containers, a filling unit, and the closing unit mentioned above.

In an exemplary embodiment, the apparatus may include a stocking unit for the closure tops. The stocking unit or magazine for the closure tops may be located behind or in the transport direction downstream of the inspection unit. In a further, the inspection unit may be integrated into the stocking unit. This means that the physical condition of the closure tops may be checked directly in a magazine for the closure tops. In this way, a very convenient and efficient removal of faulty closure tops and a very efficient response to faulty closure tops becomes possible.

In some aspects, the number of closure tops that can be accommodated in the feeding unit may be adapted to the number of containers that can be accommodated in the block system. In this way, the maximum number of intact closure tops in the feeding unit will be large enough, so that the production of the preforms or containers—excluding, for example, the last preform—present in the above-mentioned block system may be completed. The last preform has, as is known from the prior art, a temperature distribution which is different from that of preforms that have a front and a rear neighbour. In various aspects, a corresponding fault will be indicated by a fault detector.

In accordance with some aspects of the disclosure, the supply of closure tops will always be carried out in such a way that a fault upstream of the closure inspection unit will always also result in an interruption of the preform supply by the above-mentioned blocking unit.

In various aspects of the disclosure, the inspection unit, including the magazine mentioned, may be positioned essentially at the same level as the system block. Here, the inspection unit may be positioned next to the block system and, as mentioned, is located at ground level in such a way that improved accessibility for the operator is ensured. In this way, a more rapid debugging may be achieved, which at the same time may enhance the efficiency of the system.

In some aspects of the disclosure, the removal of defective closure tops may be provided for in the inspection unit. For example, the closure tops may be guided in the feeding unit not individually, but one immediately followed by another. However, by the removal of the defective closure tops, this stream will not be interrupted and no gaps will form in the closure top stream.

In various aspects of the disclosure, the apparatus may have a heating unit for the containers, and the blocking unit may be positioned upstream of the heating unit. In this way it may be achieved that in the case of a fault, the raw material of the preforms will not get into the heating device. It is to be taken into account that heated preforms which are not expanded within a defined time interval after being heated will become unusable.

The present disclosure further relates to a method of producing containers, for example, beverage containers, wherein the containers are transported along a specified transport path and are handled by at least one handling unit in a specified manner, with closure tops being fitted onto the containers by a closing unit after this handling operation, the closure tops being fed to the closing unit by means of a feeding unit.

According to the disclosure, the closure tops are inspected by an inspection unit upstream of the feeding unit, and this inspection unit will emit at least one signal which is characteristic of a condition of the closure tops.

In an exemplary method, a blocking unit which blocks the supply of containers may be controlled at least partially as a function of the characteristic signal.

Some further advantages and embodiments may emerge from the appended drawings.

BRIEF DESCRIPTION OF THE DRAWINGS

In the drawings:
FIG. 1 shows a block diagrammatic view of an apparatus according to the disclosure.

DETAILED DESCRIPTION

FIG. 1 shows a block diagram of an apparatus 1 for handling containers in accordance with the disclosure. In the apparatus 1, containers 10 in the form of preforms may be introduced into a block system 24 via a feeding unit 32. A heating unit 2, which heats the preforms first, may be located in this block system. The heating unit 2 may be followed by a reforming unit 4 such as, for example, a blow-moulding machine, which expands the heated plastic preforms to plastic containers.

The reforming unit 4 may be followed by a filling unit 6, which fills the plastic containers obtained with a liquid, for example, a beverage. Finally, a closing unit 8 follows on the transport path T downstream of the filling unit 6, which closing unit 8 closes the containers 10 with closure tops 15. These closure tops 15 may be supplied via a feeding unit 12. The feeding unit 12 may comprise a transport section or a transport rail, along which the closure tops are supplied. This means that the feeding unit 12 may also serve as a buffer section for the closure tops 15. Also in the area of the block system 24, one or several transport units may be provided, which transport the preforms or containers through the block system 24.

The closure tops 8 may be supplied via a supply line 7 to a magazine 26. The magazine 26 may include an inspection unit 18, which checks the closure tops for defects. Any faulty closure tops may be guided off through a removal unit 28. The reference numeral 14 refers to a fault detector designed to report any faults occurring as early as upstream of the magazine 26. Such faults may—for example in the form of a fault signal S1—be reported to a control unit 16 via an electric connection line 36 and may be forwarded from there via an electric connection line 34 to a preform block 22. The connection lines 34, 36 allow the bidirectional forwarding of signals, so that also any faults occurring during the production of containers may be reported to the feeding unit for the closure tops 15. The reference numeral T2 refers to the transport path, along which the closure tops 15 are transported.

The preform block 22 may then block the supply of preforms 10 into the block system 24 or the heating unit 2. Conversely, the control unit 16 may also be used to block the supply of closure tops to the magazine 26 in case of any faults occurring in the preform supply. To this end, a further blocking unit may be provided, which blocks the supply of preforms. In this way, the supply of the closure tops 15 to the closing unit 8 may be realised by means of a combination of an inspection unit 18 and an adjoining feeding unit 12 for the closure tops already inspected and found to be free of faults.

Further, sterilisation units (not shown in FIG. 1) for sterilising the closure tops 15 may be provided, and such sterilisation units may be, for example, integrated in the stocking unit 26. Such sterilisation units may both use disinfectants such as hydrogen peroxide and carry out a sterilisation process by radiation such as, for example, by electron radiation.

Sterilisation units of the kind mentioned above may also be provided for the preforms or containers 10. Further, it would also be possible to intentionally remove the block in the block system 10 temporarily, in order to enable in this way an internal buffering of containers 10 to be achieved.

It will be apparent to those skilled in the art that various modifications and variations can be made to the apparatuses and methods for producing containers of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:
1. An apparatus for producing containers, comprising:
a transport unit configured to transport containers along a specified transport path;
at least one handling unit configured to handle the containers in a specified manner;
a closing unit downstream of the handling unit in a transport direction of the containers, the closing unit being configured to fit closure tops onto the containers;

a feeding unit configured to feed the closure tops to the closing unit; and an inspection unit upstream of the feeding unit in a transport direction of the closure tops, the inspection unit being configured to inspect a physical condition of the closure tops themselves and emit at least one signal which is characteristic for a faulty physical condition of the closure tops themselves, wherein the inspection unit includes a removal device configured to remove defective closure tops, wherein the closure tops are guided in the feeding unit one immediately following another in a closure top stream, wherein by the removal of defective closure tops at the removal device the closure top stream between the feeding unit and the closing unit downstream from the removal device is not interrupted and no gaps form in the closure top stream.

2. The apparatus as claimed in claim 1, wherein that the handling unit comprises a reforming unit which transforms preforms into containers.

3. The apparatus as claimed in claim 1, further comprising a blocking unit upstream of the handling unit in the transport direction of the containers, the blocking unit being configured to interrupt the supply of containers.

4. The apparatus as claimed in claim 3, wherein the blocking unit is configured to be controlled as a function of a signal emitted by the inspection unit.

5. The apparatus as claimed in claim 3, further comprising a heating unit for the containers, the blocking unit being positioned upstream of the heating unit.

6. The apparatus as claimed in claim 1, wherein the closing unit and the handling unit are disposed together in a block system.

7. The apparatus as claimed in claim 6, wherein that the number of closure tops that can be accommodated in the feeding unit is adapted to the number of containers that can be accommodated in the block system.

8. The apparatus as claimed in claim 6, wherein the inspection unit is located at the same level as the block system.

9. The apparatus according to claim 6, wherein the closing unit and the handling unit are interlocked with each other or permanently synchronized.

10. The apparatus as claimed in claim 1, further comprising a stocking unit for the closure tops.

11. The apparatus as claimed in claim 10, wherein that the inspection unit is integrated in the stocking unit.

12. The apparatus according to claim 11, wherein the physical condition of the closure tops is checked directly in a magazine for the closure tops.

13. The apparatus as claimed in claim 10, further comprising a sterilization unit integrated in the stocking unit for sterilizing the closure tops.

14. The apparatus as claimed in claim 13, wherein the sterilization unit that both uses a disinfectant and performs a sterilization process that includes radiation.

15. The apparatus as claimed in claim 14, wherein the disinfectant includes hydrogen peroxide and the radiation includes electron radiation.

16. The apparatus as claimed in claim 1, wherein the apparatus comprises a further blocking unit which allows a blocking of the closure tops.

17. The apparatus as claimed in claim 1, wherein the faulty condition of the closure tops is selected from a group of faulty conditions which comprises faulty threads, missing threads and a deformation of the closure top.

18. A method of producing containers, comprising:
transporting the containers along a specified transport path;
handling the containers in a specified manner along the transport path;
feeding, at a feeding unit, closure tops to a closing unit;
fitting the closure tops onto the containers;
inspecting the closure tops before feeding the closure tops to the closing unit; and
emitting at least one signal to indicate a specified physical condition of the closure tops in response to said inspection of the closure tops, wherein the closure tops are guided in the closing unit one immediately following another in a closure top stream, wherein defective closure tops are removed at a removal device, and wherein the removal of the defective closure tops at the removal device the closure top stream between the feeding unit and the closing unit downstream from the removal device does not interrupt the closure top stream and no gaps form in the closure top stream.

19. The method as claimed in claim 18, further comprising blocking, at least temporarily, said transporting of containers as a function of the emitted signal.

20. The method according to claim 18, wherein the physical condition of the closure tops is checked directly in a magazine for the closure tops.

21. An apparatus for producing containers, comprising:
a transport unit configured to transport containers along a specified transport path;
at least one handling unit configured to handle the containers in a specified manner;
a closing unit downstream of the handling unit in a transport direction of the containers, the closing unit being configured to fit closure tops onto the containers;
a feeding unit configured to feed the closure tops to the closing unit; and
an inspection unit upstream of the feeding unit in a transport direction of the closure tops, the inspection unit being configured to inspect a physical condition of the closure tops themselves and emit at least one signal which is characteristic for a faulty physical condition of the closure tops themselves, wherein the closure tops are guided in the feeding unit one immediately following another in a closure top stream, wherein by removal of defective closure tops the closure top stream between the inspection unit and the closing unit is not interrupted and no gaps form in the closure top stream, and wherein the faulty physical condition of the closure tops is selected from a group of faulty physical conditions, which comprises faulty threads and missing threads of the closure tops.

* * * * *